United States Patent
Sun et al.

(10) Patent No.: US 10,263,664 B2
(45) Date of Patent: Apr. 16, 2019

(54) SIGNAL TRANSMISSION METHOD, APPARATUS, AND SIGNAL TRANSMISSION SYSTEM

(71) Applicant: Huawei Technologies Co., Ltd., Shenzhen (CN)

(72) Inventors: Fanglin Sun, Shenzhen (CN); Bin Zhou, Shenzhen (CN); Shicai Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 15/495,781

(22) Filed: Apr. 24, 2017

(65) Prior Publication Data

US 2017/0230078 A1    Aug. 10, 2017

Related U.S. Application Data

(63) Continuation of application No. PCT/CN2014/091907, filed on Nov. 21, 2014.

(51) Int. Cl.
*H04B 3/32* (2006.01)
*H04L 12/28* (2006.01)
(Continued)

(52) U.S. Cl.
CPC ........... *H04B 3/32* (2013.01); *H04L 12/2869* (2013.01); *H04M 11/062* (2013.01); *H04B 3/487* (2015.01); *H04M 11/06* (2013.01)

(58) Field of Classification Search
CPC ....... G02F 1/31; H04M 11/062; H04M 3/304; H04M 11/06
(Continued)

(56) References Cited

U.S. PATENT DOCUMENTS 4,567,462 A * 1/1986 Leiby ............... G01D 5/247
                                                     341/13
5,416,599 A * 5/1995 Ubukata ............. H04N 9/84
                                                     386/264
(Continued)

FOREIGN PATENT DOCUMENTS

CN           1353891 A       6/2002
CN         101136659 A       3/2008
(Continued)

OTHER PUBLICATIONS

Spirent, "TD-LTE and MIMO Beamforming—Principles and Test Challenges", Aug. 22, 2017, 1 page.

*Primary Examiner* — Akelaw Teshale
(74) *Attorney, Agent, or Firm* — Slater Matsil, LLP

(57) ABSTRACT

Embodiments of the present invention provide a signal transmission method. The method includes: sequentially rotating phases of to-be-sent signals on a line set 1 by different angles and in relative to phases of to-be-sent signals on a line set 2, and sequentially sending, to a user side, the to-be-sent signals whose phases are rotated. The method also includes receiving a rotation factor that is of a high-quality received signal on the line set 1 and that is fed back by the user side, where the high-quality received signal includes a received signal with a high signal-to-noise ratio or high power. The method also includes using the rotation factor fed back by the user side as a fixed rotation factor, and rotating, according to the fixed rotation factor, a phase of a signal to be subsequently sent on the line set 1.

16 Claims, 6 Drawing Sheets

(51) Int. Cl.
*H04M 11/06* (2006.01)
*H04B 3/487* (2015.01)

(58) Field of Classification Search
USPC .............................................. 379/28, 406.01
See application file for complete search history.

(56) References Cited

U.S. PATENT DOCUMENTS

| | | | |
|---|---|---|---|
| 6,420,778 B1* | 7/2002 | Sinyansky | H05K 1/0216 257/664 |
| 6,647,067 B1* | 11/2003 | Hjelm | H04B 3/487 370/201 |
| 2005/0174928 A1* | 8/2005 | Yoneya | H03D 3/007 370/208 |
| 2007/0280689 A1* | 12/2007 | Boffi | G02F 1/0136 398/65 |
| 2009/0116582 A1 | 5/2009 | Ashikhmin et al. | |
| 2009/0147666 A1 | 6/2009 | Fang et al. | |
| 2010/0200570 A1* | 8/2010 | Chirico | D21G 1/0053 219/619 |
| 2012/0263464 A1* | 10/2012 | Koike-Akino | H04B 10/6162 398/65 |
| 2013/0055006 A1* | 2/2013 | Kossel | G06F 1/04 713/503 |
| 2013/0101094 A1* | 4/2013 | Peeters | H04B 3/32 379/28 |

FOREIGN PATENT DOCUMENTS

| | | | | |
|---|---|---|---|---|
| CN | | 101843000 A | 9/2010 | |
| CN | | 102932289 A | 2/2013 | |
| EP | | 2493084 B1 | 12/2013 | |
| WO | | 2013026479 A1 | 2/2013 | |
| WO | WO | 2013026479 A1 * | 2/2013 | ............... H04B 3/32 |
| WO | WO- | 2013026479 A1 * | 2/2013 | ............... H04B 3/32 |

* cited by examiner

SIGNAL TRANSMISSION METHOD, APPARATUS, AND SIGNAL TRANSMISSION SYSTEM

CROSS-REFERENCE TO RELATED APPLICATIONS

This application is a continuation of International Application No. PCT/CN2014/091907, filed on Nov. 21, 2014, the disclosure of which is hereby incorporated by reference in its entirety.

TECHNICAL FIELD

The present invention relates to the field of data communications, and specifically, to a signal transmission method, an apparatus, and a signal transmission system.

BACKGROUND

A digital subscriber line (DSL) is a high-speed data transmission technology for transmission over a phone twisted pair, for example, an unshielded twisted pair (UTP). There are multiple DSL lines in a DSL system. Currently, a DSL access multiplexer (DSLAM) is generally used on a network side to provide access services for the multiple DSL lines. Due to an electromagnetic induction principle, mutual crosstalk occurs between signals on the multiple DSL lines that access the network side.

FIG. 1 is a schematic working diagram of synchronous sending and synchronous receiving in a DSL system. In FIG. 1, each user accesses a network side by using a twisted pair. A downstream and upstream shared channel H on the $k^{th}$ tone in a frequency domain may be expressed in a matrix form:

$$H = \begin{bmatrix} h_{11} & h_{12} & \cdots & h_{1M} \\ h_{21} & h_{22} & \cdots & h_{2M} \\ \vdots & \vdots & \ddots & \vdots \\ h_{M1} & h_{M2} & \cdots & h_{MM} \end{bmatrix}_{M \times M}$$

$h_{ij}$ is a transmission equation of a pair j to a pair i. In an actual case, maximum values of i and j are equal, and are equal to a quantity of lines in the DSL system, and the quantity is assumed to be M. Therefore, H is expressed as an M×M channel transmission matrix. Further, it is assumed that x is an M×1 channel input vector, y is an M×1 channel output vector, and n is an M×1 noise vector. Therefore, an ultimate channel transmission equation is expressed in the following form:

$$y=Hx+n$$

Crosstalk of a twisted pair is strong in a high frequency. In an example, to eliminate crosstalk, a vectored DSL technology may be used to eliminate far-end crosstalk. In an existing vectored DSL technology, based on characteristics of performing joint sending and receiving on the network side, a signal processing method is used to cancel interference caused by far-end crosstalk FEXT. A premise of using the characteristics of performing joint sending and receiving on the network side is that symbols are synchronous. However, in a strong crosstalk scenario, a signal-to-noise ratio (SNR) of a signal received by CPE is excessively low. As a result, the customer-premises equipment CPE on a user side cannot precisely maintain synchronization with a network side device, and therefore, cannot precisely feed back a clipped error sample to a VCE. Consequently, FEXT elimination is affected.

SUMMARY

Embodiments of the present invention provide a signal transmission method, an apparatus, and a signal transmission system, so as to adaptively select a high-quality received signal for data processing.

According to a first aspect, an embodiment of the present invention provides a signal transmission method. The method includes sequentially rotating phases of to-be-sent signals on a line set 1 by different angles and in relative to phases of to-be-sent signals on a line set 2, and sequentially sending, to a user side, the to-be-sent signals whose phases are rotated, where the line set 1 includes at least one activated channel or channel that is being activated, the line set 2 includes at least one activated channel or channel that is being activated, and crosstalk is caused by the signals on the line set 2 against the signals on the line set 1 during transmission. The method also includes receiving a rotation factor that is of a high-quality received signal on the line set 1 and that is fed back by the user side, where the high-quality received signal includes a received signal with a high signal-to-noise ratio or high power. The method also includes using the rotation factor fed back by the user side as a fixed rotation factor, and rotating, according to the fixed rotation factor, a phase of a signal to be subsequently sent on the line set 1.

In a first possible implementation manner of the first aspect, after the phases of the to-be-sent signals on the line set 2 are rotated by rotation angles different from the rotation angles of the phases of the to-be-sent signals on the line set 1, the to-be-sent signals on the line set 2 are sent to the user side.

In a second possible implementation manner of the first aspect, the to-be-sent signals on the line set 2 are directly sent to the user side without phase rotation.

With reference to the first aspect, the first possible implementation manner of the first aspect, or the second possible implementation manner of the first aspect, in a third possible implementation manner, the to-be-sent signals on the line set 1 are pilot signals, the to-be-sent signals on the line set 2 are also pilot signals, and the signals sent on the line set 1 and the line set 2 are synchronous.

With reference to the first possible implementation manner of the first aspect, in a fourth possible implementation manner, the method further includes: receiving a rotation factor that is of a received signal on the line set 2 and that is fed back by the user side, where the fed-back rotation factor of the received signal on the line set 2 is a rotation factor of a received signal on the line set 2 at a moment when a received signal on the line set 1 is in high quality.

According to a second aspect, an embodiment of the present invention provides a signal transmission method. The method includes separately receiving signals that are sent from a network side on a line set 1 and a line set 2, where before the signals on the line set 1 are sent, phases of the signals on the line set 1 are sequentially rotated by different angles and in relative to phases of the signals on the line set 2, the line set 1 includes at least one activated channel or channel that is being activated, the line set 2 includes at least one activated channel or channel that is being activated, and crosstalk is caused by the signals on the line set 2 against the signals on the line set 1 during transmission. The method also includes comparing quality statuses of the received signals on the line set 1, and selecting a high-quality signal for signal processing, where the high-quality signal includes a received signal with a high signal-to-noise ratio or high power; determining a rotation factor of the high-quality signal on the line set 1. The method also includes notifying the network side of the determined rotation factor of the high-quality signal.

In a first possible implementation manner of the second aspect, the received signals on the line set 1 are pilot signals, the received signals on the line set 2 are also pilot signals, and the signals on the line set 1 and the line set 2 are sent synchronously.

With reference to the second aspect or the first possible implementation manner of the second aspect, in a second possible implementation manner, the method further includes: notifying the network side of a rotation factor of a received signal on the line set 2, where the rotation factor of the received signal on the line set 2 is a rotation factor of a received signal on the line set 2 at a moment when a received signal on the line set 1 is in high quality.

According to a third aspect, an embodiment of the present invention provides a network side device. The network side device includes a first sending unit 601, a phase adjustment unit 603, and a first receiving unit 605. The phase adjustment unit 603 is configured to sequentially rotate phases of to-be-sent signals on a line set 1 by different angles and in relative to phases of to-be-sent signals on a line set 2, where the line set 1 includes at least one activated channel or channel that is being activated, the line set 2 includes at least one activated channel or channel that is being activated, and crosstalk is caused by the signals on the line set 2 against the signals on the line set 1 during transmission. The first sending unit 601 is configured to sequentially send, to a user side, the to-be-sent signals whose phases are rotated; the first receiving unit 605 is configured to receive a rotation factor that is of a high-quality received signal on the line set 1 and that is fed back by the user side, where the high-quality received signal includes a received signal with a high signal-to-noise ratio or high power. The first sending unit 601 is further configured to use the rotation factor fed back by the user side as a fixed rotation factor, and rotate, according to the fixed rotation factor, a phase of a signal to be sent on the line set 1.

In a first possible implementation manner of the third aspect, the network side device further includes: a second sending unit 607, configured to directly send the to-be-sent signals on the line set 2 to the user side without phase rotation, or send the to-be-sent signals on the line set 2 to the user side after the phases of the to-be-sent signals on the line set 2 are rotated by rotation angles different from the rotation angles of the phases of the to-be-sent signals on the line set 1.

With reference to the third aspect or the first possible implementation manner of the third aspect, in a second possible implementation manner, the first receiving unit 605 is further configured to receive a rotation factor that is of a received signal on the line set 2 and that is fed back by the user side, and the fed-back rotation factor of the received signal on the line set 2 is a rotation factor of a received signal on the line set 2 at a moment when a received signal on the line set 1 is in high quality.

According to a fourth aspect, an embodiment of the present invention provides a user side device. The user side device includes a receiving unit 701, a phase determining unit 703, and a signal sending unit 707. The receiving unit 701 is configured to receive signals that are sent from a network side on a line set 1 and a line set 2, where before the signals on the line set 1 are sent, phases of the signals on the line set 1 are sequentially rotated by different angles and in relative to phases of the signals on the line set 2, the line set 1 includes at least one activated channel or channel that is being activated, the line set 2 includes at least one activated channel or channel that is being activated, and crosstalk is caused by the signals on the line set 2 against the signals on the line set 1 during transmission. The phase determining unit 703 is configured to compare quality statuses of the received signals on the line set 1, and determine a rotation factor of a high-quality signal on the line set 1, where the high-quality signal includes a received signal with a high signal-to-noise ratio or high power. The sending unit 707 is configured to notify the network side of the determined rotation factor of the high-quality signal.

In a first possible implementation manner of the fourth aspect, the user side device further includes: a signal processing unit 705 configured to perform signal processing on the high-quality signal.

With reference to the fourth aspect or the first possible implementation manner of the fourth aspect, in a second possible implementation manner, the sending unit 707 is further configured to notify the network side of a rotation factor of a received signal on the line set 2, where the rotation factor of the received signal on the line set 2 is a rotation factor of a received signal on the line set 2 at a moment when a received signal on the line set 1 is in high quality.

According to a fifth aspect, an embodiment of the present invention provides a system, including the network side device and the user side device mentioned above, and the network side device is connected to the user side device by using a line.

According to solutions described in the embodiments, on a network side, sending devices on different lines select tones of a same frequency band, and select at least one activated line or line that is being activated to send signals with different phases. On a user side, a high-quality signal can be selected for data information transmission or digital signal processing. In this way, relatively high signal quality can be maintained even in an environment with strong crosstalk.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
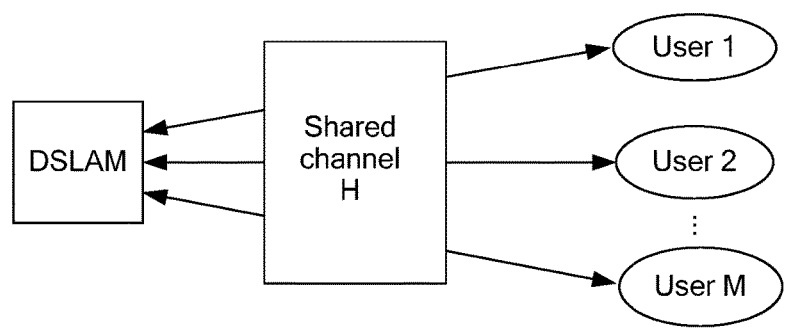
FIG. 1 is schematic working diagram of synchronous sending and synchronous receiving at a DSLAM end.

As shown in FIG. 1, a DSL system serves as a multiuser system. If multiuser downlink signals sent by a central office end have synchronous symbols and it may be considered that clocks are synchronous, multiple downstream crosstalk channels may be abstracted as a multipath downstream channel. Crosstalk channels may be classified into three types, including a crosstalk channel in which crosstalk is caused by a line connected to activated CPE against a line connected to activated CPE, a crosstalk channel in which crosstalk is caused by a line connected to activated CPE against a line connected to CPE that is being activated, and a crosstalk channel in which crosstalk is caused by a line connected to CPE that is being activated against a line connected to activated CPE.

Figure 2:
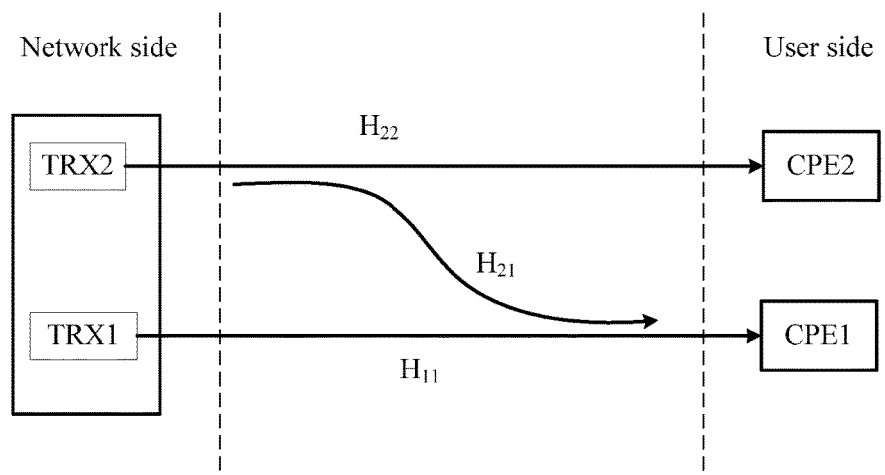
FIG. 2 is a schematic diagram of a crosstalk model in an embodiment of the present invention.

In a DSL system, transceivers TRXs on a network side are in a one-to-one correspondence with CPEs on a user side. However, for ease of description, one or more activated CPEs or CPEs that are being activated on the user side are collectively abstracted as CPE1, which is connected to a transceiver TRX1 (transceiver) on the network side. Lines between CPE1 and TRX1 are referred to as a line set 1. Another one or more activated CPEs or CPEs that are being activated on the user side are collectively abstracted as CPE2, which is connected to a transceiver TRX2 on the network side. Lines between CPE2 and TRX2 are referred to as a line set 2. A transmission channel of the line set 1 is $H_{11}$. A transmission channel of the line set 2 is $H_{22}$. A crosstalk channel in which crosstalk is caused by the line set 2 against the line set 1 is $H_{21}$, as specifically shown in FIG. 2.

Based on a crosstalk model, if TRX1 and TRX2 send a same pilot (Pilot) signal X, a signal Y received by CPE1 can be denoted as: $Y=H_{21} \times X + H_{11} \times X + N = (H_{21}+H_{11}) \times X + N$. $H_{21} \times X$ is a crosstalk signal, $H_{11} \times X$ is a non-crosstalk signal (or a direct channel signal), and N is line noise.

For a stable line, values of line channel $H_{21}$ and $H_{11}$ may be considered as fixed values (unless a line environment changes, for example, in terms of temperature, oxidation, or the like). Therefore, $H_{21}$ and $H_{11}$ cannot be changed, but the signal X can be changed. For example, before sending the signal X, TRX1 adjusts a phase of the signal by adding a phase rotation factor k to the signal. In this case, the signal is k×X, and therefore, a received signal Y on a CPE2 side may be updated as: $Y=(H_{21}+H_{11} \times k) \times X + N$. If there is a suitable value k that makes response phases of $H_{21}$ and $H_{11} \times k$ on a specific tone close to each other, a signal-to-noise ratio or energy of the received signal Y increases. Conversely, if response phases of $H_{21}$ and $H_{11} \times k$ are opposite or greatly different, the signal-to-noise ratio or the energy of the received signal Y decreases. The signal-to-noise ratio is denoted by $$\frac{Y}{N}.$$

In addition, only TRX1 performs phase adjustment on the signal X before sending the signal X, or only TRX2 performs phase adjustment on the signal X before sending the signal X, or TRX1 and TRX2 simultaneously perform phase adjustment on the signal. A same effect can be achieved provided that a TRX on at least one of the lines performs phase adjustment before sending the signal X.

Figure 3:
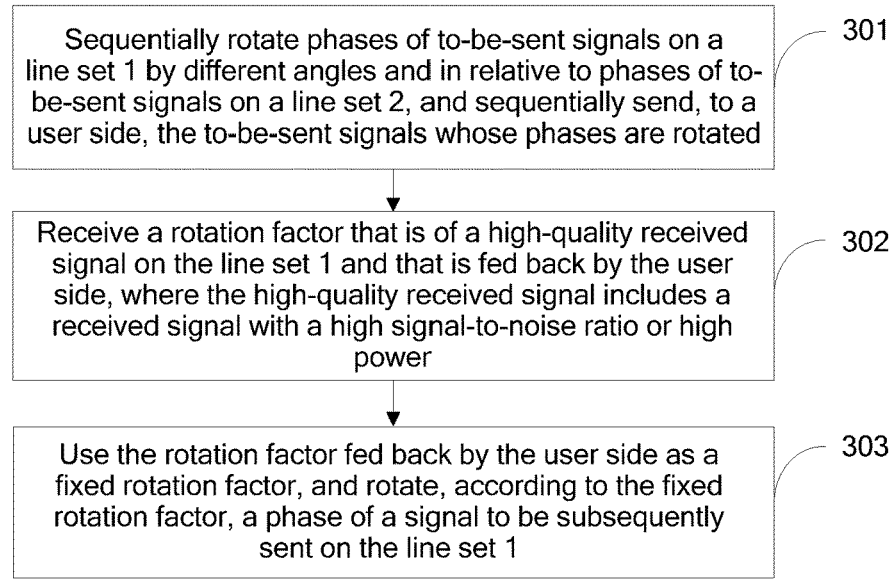
FIG. 3 is a schematic flowchart of a method according to an embodiment of the present invention.

In view of this, an embodiment of the present invention provides a signal transmission method. The method is described from a perspective of a network side. As shown in FIG. 3, the method includes the following steps.

301. Sequentially rotate phases of to-be-sent signals on a line set 1 by different angles and in relative to phases of to-be-sent signals on a line set 2, and sequentially send, to a user side, the to-be-sent signals whose phases are rotated, where the line set 1 includes at least one activated channel or channel that is being activated, the line set 2 includes at least one activated channel or channel that is being activated, and crosstalk is caused by the signals on the line set 2 against the signals on the line set 1 during transmission.

302. Receive a rotation factor that is of a high-quality received signal on the line set 1 and that is fed back by the user side, where the high-quality received signal includes a received signal with a high signal-to-noise ratio or high power.

303. Use the rotation factor fed back by the user side as a fixed rotation factor, and rotate, according to the fixed rotation factor, a phase of a signal to be subsequently sent on the line set 1.

More specifically, in step 301, the to-be-sent signals on the line set 2 are directly sent to the user side without phase rotation, or sent to the user side after the phases of the to-be-sent signals on the line set 2 are rotated by rotation angles different from the rotation angles of the phases of the to-be-sent signals on the line set 1.

Further, the to-be-sent signals on the line set 1 are pilot signals, the to-be-sent signals on the line set 2 are also pilot signals, and the signals sent on the line set 1 and the line set 2 are synchronous.

Still further, channels of the line set 1 and the line set 2 are twisted-pair channels.

In addition, if the phases of the to-be-sent signals on the line set 2 are rotated by the rotation angles different from the rotation angles of the phases of the to-be-sent signals on the line set 1, the method further includes: receiving a rotation factor that is of a received signal on the line set 2 and that is fed back by the user side. The fed-back rotation factor of the received signal on the line set 2 is a rotation factor of a received signal on the line set 2 at a moment when a received signal on the line set 1 is in high quality.

According to the solution described in this embodiment, on a network side, sending devices on different lines select tones of a same frequency band, and select at least one activated line or line that is being activated to send signals with different phases. On a user side, a high-quality signal can be selected for data information transmission or digital signal processing. The digital signal processing includes clock recovery, channel sounding, or the like. In this way, relatively high signal quality can be maintained even in an environment with strong crosstalk.

Figure 4:
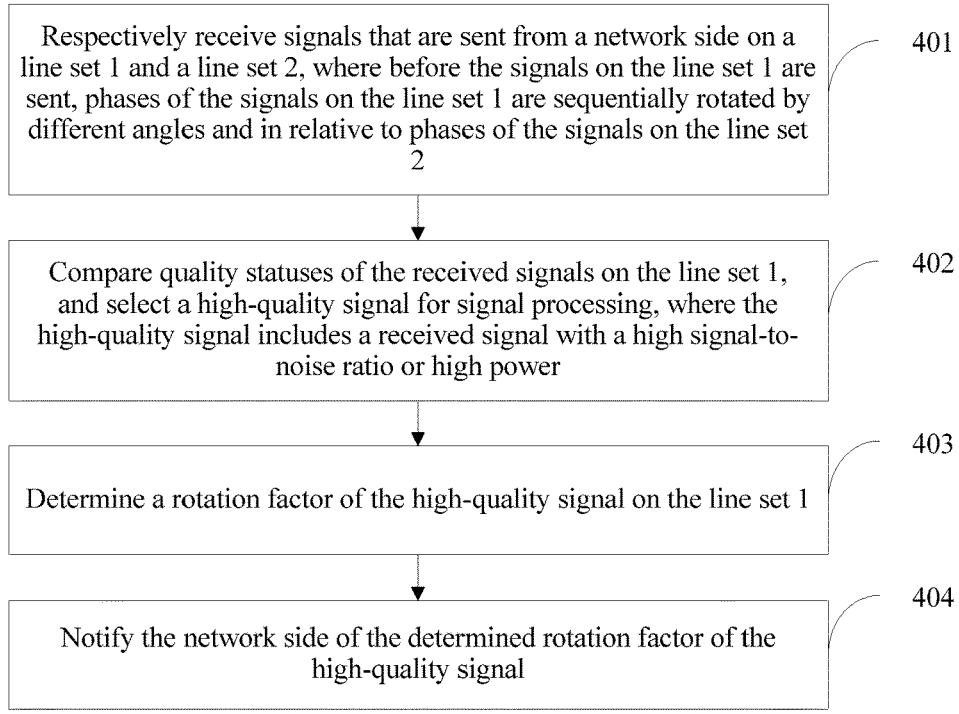
FIG. 4 is a schematic flowchart of a method according to another embodiment of the present invention.

An embodiment of the present invention further provides a signal transmission method. The method is described from a perspective of a user side. As shown in FIG. 4, the method includes the following steps.

401. Separately receive signals that are sent from a network side on a line set 1 and a line set 2, where before the signals on the line set 1 are sent, phases of the signals on the line set 1 are sequentially rotated by different angles and in relative to phases of the signals on the line set 2, the line set 1 includes at least one activated channel or channel that is being activated, the line set 2 includes at least one activated channel or channel that is being activated, and crosstalk is caused by the signals on the line set 2 against the signals on the line set 1 during transmission.

402. Compare quality statuses of the received signals on the line set 1, and select a high-quality signal for signal processing, where the high-quality signal includes a received signal with a high signal-to-noise ratio or high power.

403. Determine a rotation factor of the high-quality signal on the line set 1.

404. Notify the network side of the determined rotation factor of the high-quality signal.

In this way, a network side device and a user side device on the line set 1 can transmit data based on the determined rotation factor, thereby maintaining relatively high data transmission quality.

More specifically, in step 401, the phases of the signals on the line set 2 are not rotated, or are rotated by rotation angles different from the rotation angles of the phases of the signals on the line set 1.

Further, the received signals on the line set 1 are pilot signals, the received signals on the line set 2 are also pilot signals, and the signals on the line set 1 and the line set 2 are sent synchronously.

Still further, channels of the line set 1 and the line set 2 are twisted-pair channels.

More specifically, the signal processing includes clock recovery, channel measurement, or the like on the user side.

In addition, if the phases of the signals on the line set 2 are rotated by rotation angles different from the rotation angles of the phases of the signals on the line set 1, the method may further include (not shown in FIG. 4): 405. Notify the network side of a rotation factor of a received signal on the line set 2, where the rotation factor of the received signal on the line set 2 is a rotation factor of a received signal on the line set 2 at a moment when a received signal on the line set 1 is in high quality.

Figure 5:
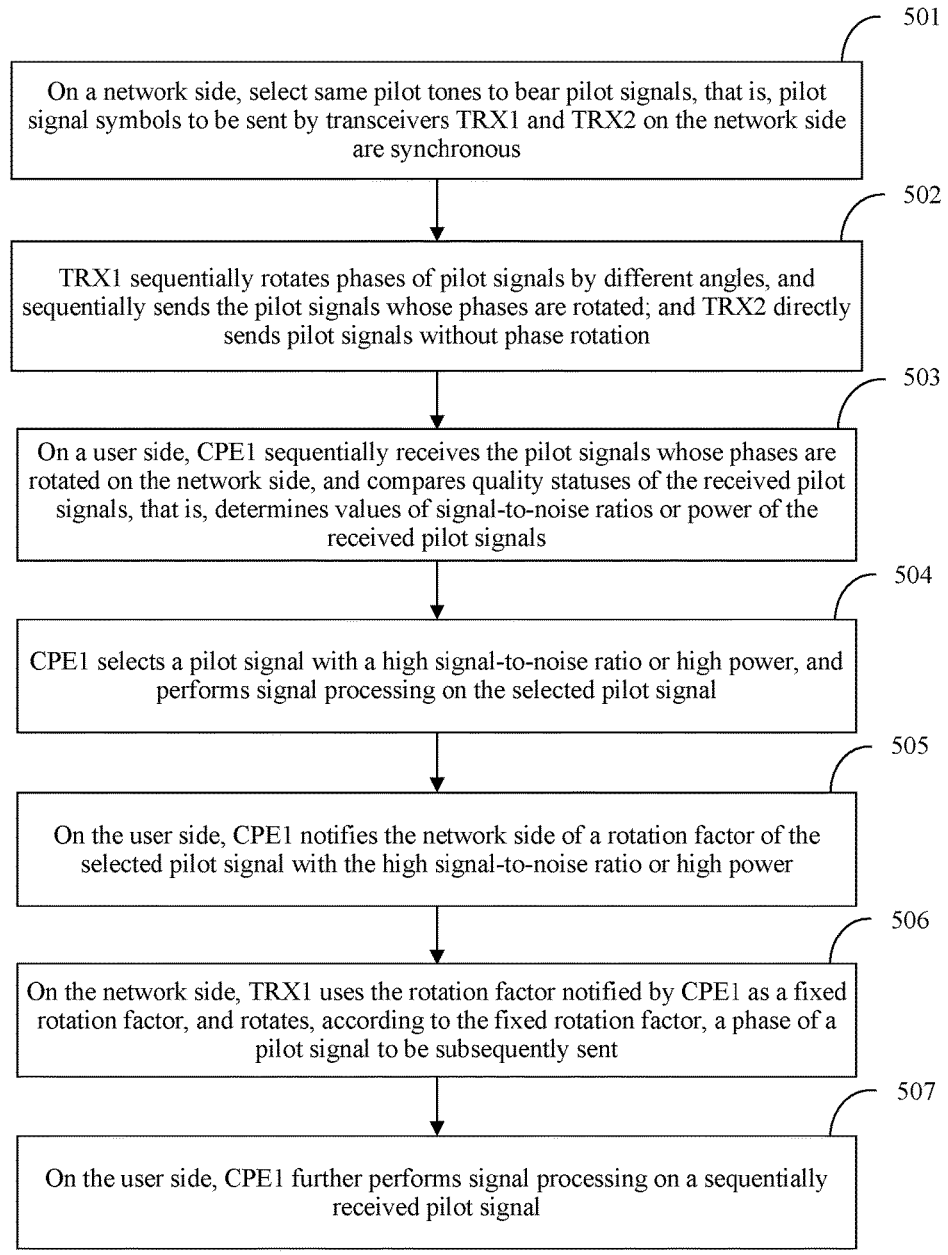
FIG. 5 is a schematic flowchart of a method according to still another embodiment of the present invention.

A crosstalk channel in which crosstalk is caused by a line connected to activated CPE against a line connected to new CPE that is being activated as an example for detailed description below. Another embodiment of the present invention provides a signal transmission method in this scenario, as shown in FIG. 5. In this scenario, a line set 2 is multiple twisted-pair channels connected to multiple activated CPEs (collectively referred to as CPE2), and multiple TRXs (collectively referred to as TRX2) on a network side are connected to CPE2 on a user side by using the line set 2; a line set 1 is multiple twisted-pair channels connected to multiple CPEs (collectively referred to as CPE1) that are being activated, and multiple TRXs (collectively referred to as TRX1) on the network side are connected to CPE1 on the user side by using the line set 1.

The method includes the following steps.

501. On the network side, select same pilot tones to bear pilot signals, that is, pilot signal symbols to be sent by transceivers TRX1 and TRX2 on the network side are synchronous.

502. TRX1 sequentially rotates phases of pilot signals by different angles, and sequentially sends the pilot signals whose phases are rotated; and TRX2 directly sends pilot signals without phase rotation.

An interval between rotation angles may be any arbitrary value, for example, 1°, 3°, 5°, 10°, 20°, 60°, or the like. Both a network side device and a user side device have known a rule or a cycle of phase rotation, but the rule or the cycle of rotation is not specifically limited. In the following, a multiple of 90° for phase rotation is used as an example for description. TRX1 sequentially rotates n symbols by 90°, n symbols by 180°, n symbols by 270°, n symbols by 360°, and n symbols by 90°, and the rest can be deduced by analogy, where n is greater than or equal to 1. It is assumed that a phase rotation factor is denoted by $k=e^{\Theta j}$, and a signal to be sent after phase rotation is k×X. In this case, a pilot signal sent by TRX1 can be denoted by $Y=(H_{21} \times H_{11} \times k) \times X+N$. In addition, when TRX1 rotates n symbols by 270° (that is, $k=e^{270/360 \cdot 2\pi j}$), phase angles of $H_{21}$ and $H_{11} \times k$ are closest, and therefore an amplitude of $|H_{21}+H_{11} \times k|$ is relatively large, that is, the signal is in relatively high quality. In this way, the signal Y is strengthened.

503. On the user side, CPE1 sequentially receives the pilot signals whose phases are rotated on the network side, and compares quality statuses of the received pilot signals, that is, determines signal-to-noise ratios or values of signal-to-noise ratios or power of the received pilot signals.

504. CPE1 selects a received pilot signal with a high signal-to-noise ratio or high power, and performs signal processing on the selected pilot signal, for example, perform clock recovery, channel measurement, or the like on the user side.

The method further includes the following steps.

505. On the user side, CPE1 notifies the network side of a rotation factor of the selected pilot signal with the high signal-to-noise ratio or high power.

506. On the network side, TRX1 uses the rotation factor notified by CPE1 as a fixed rotation factor, and rotates, according to the fixed rotation factor, a phase of a pilot signal to be subsequently sent.

507. On the user side, CPE1 further performs signal processing on a subsequently received pilot signal.

According to the solutions described in this embodiment, on a network side, sending devices on different lines select tones of a same frequency band, and select at least one activated line or line that is being activated to send pilot signals with different phases. On a user side, a high-quality pilot signal is selected for data information transmission or digital signal processing. The digital signal processing includes clock recovery, channel measurement, or the like. In this way, relatively high signal quality can be maintained even in an environment with strong crosstalk.

An embodiment of the present invention further provides a network side device, including a first sending unit 601, a phase adjustment unit 603, and a first receiving unit 605.

The phase adjustment unit 603 is configured to sequentially rotate phases of to-be-sent signals on a line set 1 by different angles and in relative to phases of to-be-sent signals on a line set 2, where the line set 1 includes at least one activated channel or channel that is being activated, the line set 2 includes at least one activated channel or channel that is being activated, and crosstalk is caused by the signals on the line set 2 against the signals on the line set 1 during transmission.

The first sending unit 601 is configured to sequentially send, to a user side, the to-be-sent signals whose phases are rotated.

The first receiving unit 605 is configured to receive a rotation factor that is of a high-quality received signal on the line set 1 and that is fed back by the user side, where the high-quality received signal includes a received signal with a high signal-to-noise ratio or high power.

The first sending unit 601 is further configured to use the rotation factor fed back by the user side as a fixed rotation factor, and rotate, according to the fixed rotation factor, a phase of a signal to be subsequently sent on the line set 1.

Figure 6:
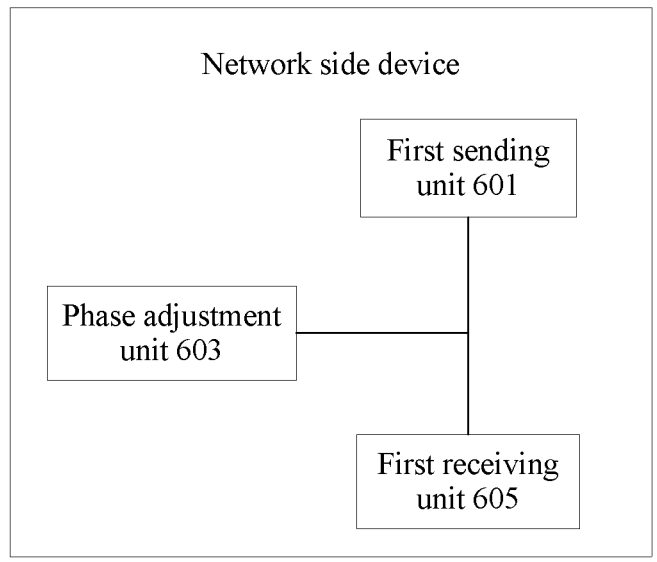
FIG. 6 is a schematic structural diagram of a device according to an embodiment of the present invention.

The network side device further includes: a second sending unit 607 (not shown in FIG. 6), configured to directly send the to-be-sent signals on the line set 2 to the user side without phase rotation, or send the to-be-sent signals on the line set 2 to the user side after the phases of the to-be-sent signals on the line set 2 are rotated by rotation angles different from the rotation angles of the phases of the to-be-sent signals on the line set 1.

The first receiving unit 605 is further configured to receive a rotation factor that is of a received signal on the line set 2 and that is fed back by the user side, and the fed-back rotation factor of the received signal on the line set 2 is a rotation factor of a received signal on the line set 2 at a moment when a received signal on the line set 1 is in high quality.

The to-be-sent signals on the line set 1 are pilot signals, the to-be-sent signals on the line set 2 are also pilot signals, and the signals sent on the line set 1 and the line set 2 are synchronous.

Still further, the network side device is a DSLAM device. The first sending unit 601 and the first receiving unit 605 constitute a transceiver of the DSLAM device. Channels of the line set 1 and the line set 2 are twisted-pair channels.

An embodiment of the present invention further provides a user side device, including a receiving unit 701, a phase determining unit 703, and a signal sending unit 707.

The receiving unit 701 is configured to receive signals that are sent from a network side on a line set 1 and a line set 2, where before the signals on the line set 1 are sent, phases of the signals on the line set 1 are sequentially rotated by different angles and in relative to phases of the signals on the line set 2, the line set 1 includes at least one activated channel or channel that is being activated, the line set 2 includes at least one activated channel or channel that is being activated, and crosstalk is caused by the signals on the line set 2 against the signals on the line set 1 during transmission.

The phase determining unit 703 is configured to compare quality statuses of the received signals on the line set 1, and determine a rotation factor of a high-quality signal on the line set 1, where the received high-quality signal includes a received signal with a high signal-to-noise ratio or high power; and select the high-quality signal for signal processing.

The user side device further includes: the sending unit 707, configured to notify the network side of the rotation factor that is of the high-quality received signal and that is determined by the phase determining unit 703.

Figure 7:
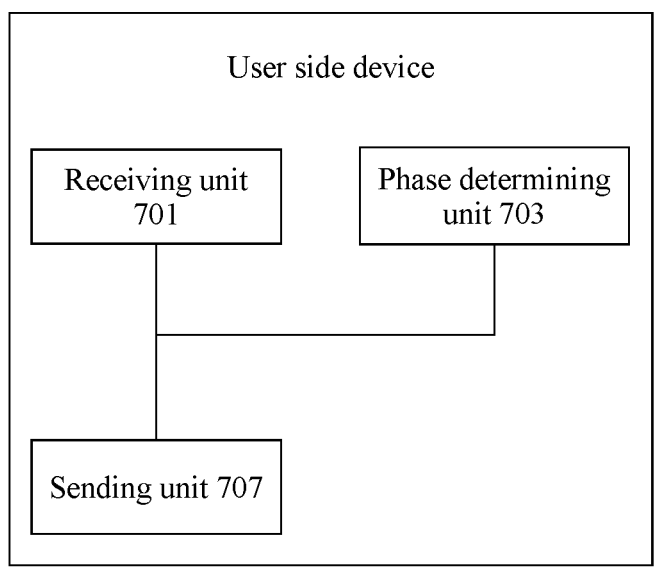
FIG. 7 is a schematic structural diagram of a device according to another embodiment of the present invention.

Further, a signal processing unit 705 (not shown in FIG. 7) is configured to perform signal processing on the high-quality signal determined by the phase determining unit 703. More specifically, the signal processing includes clock recovery, channel measurement, or the like on the user side.

It should be noted that, the phases of the signals on the line set 2 are not rotated, or are rotated by rotation angles different from the rotation angles of the phases of the signals on the line set 1.

In this case, the sending unit 707 is further configured to notify the network side of a rotation factor of a received signal on the line set 2. The rotation factor of the received signal on the line set 2 is a rotation factor of a received signal on the line set 2 at a moment when a received signal on the line set 1 is in high quality.

Further, the received signals on the line set 1 are pilot signals, the received signals on the line set 2 are also pilot signals, and the signals on the line set 1 and the line set 2 are sent synchronously.

Still further, the user side device may be customer premise equipment (CPE) or another user terminal device. Channels of the line set 1 and the line set 2 are twisted-pair channels.

Figure 8:
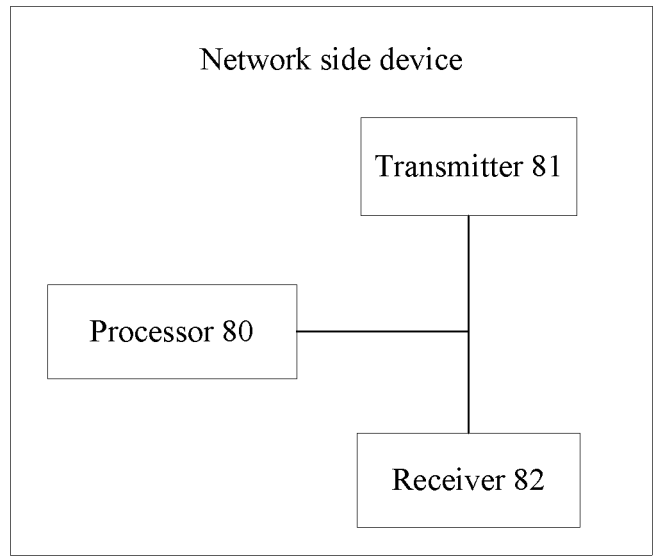
FIG. 8 is a schematic structural diagram of a device according to still another embodiment of the present invention.

FIG. 8 is a schematic structural diagram of a network side device according to still another embodiment of the present invention. As shown in FIG. 8, the network side device includes a processor 80, a transmitter 81, and a receiver 82. The processor 8o executes the steps performed by the phase adjustment unit 603 in FIG. 6, the transmitter 81 executes the steps performed by the first sending unit 601 in FIG. 6, and the receiver 82 executes the steps performed by the first receiving unit 605 in FIG. 6. For details, refer to the embodiment corresponding to FIG. 6, and the details are not described herein.

Figure 9:
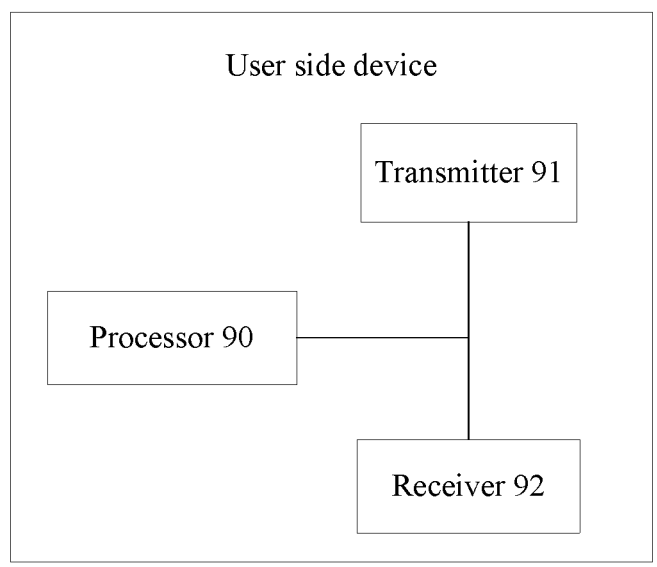
FIG. 9 is a schematic structural diagram of a device according to still another embodiment of the present invention.

FIG. 9 is a schematic structural diagram of a user side device according to still another embodiment of the present invention. As shown in FIG. 9, the user side device includes a processor 90, a transmitter 91, and a receiver 92. The processor 90 executes the steps performed by the phase determining unit 703 and the signal processing unit 705 in FIG. 7, the transmitter 91 executes the steps performed by the sending unit 707 in FIG. 7, and the receiver 92 executes the steps performed by the receiving unit 701 in FIG. 7. For details, refer to the embodiment corresponding to FIG. 7, and the details are not described herein.

Figure 10:
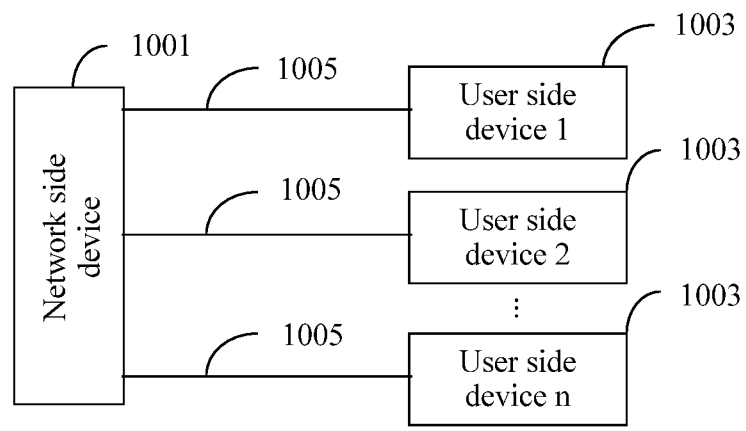
FIG. 10 is a schematic structural diagram of a network system according to an embodiment of the present invention.

An embodiment of the present invention further provides a network system. As shown in FIG. 10, the network system includes a network side device 1001 and a user side device 1003. The network side device 1001 is connected to the user side device 1003 by using a line 1005.

The network side device 1001 is consistent with the network side device in the foregoing embodiments, and the user side device 1003 is consistent with the user side device in the foregoing embodiments. Details are not described herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Figure 11:
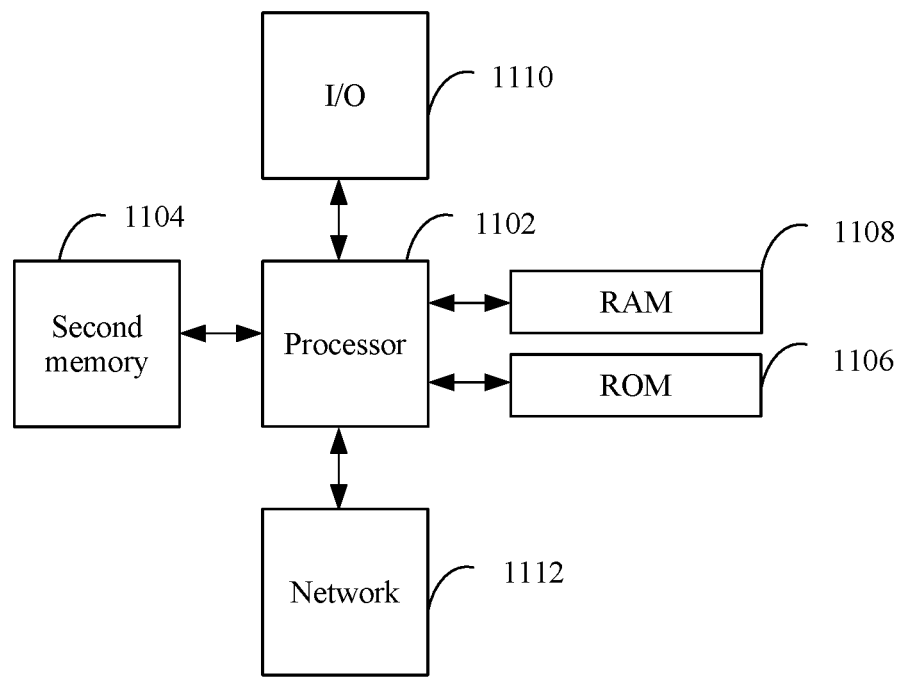
FIG. 11 is a schematic structural diagram of network components according to an embodiment of the present invention.

Specifically, a process of the foregoing network processing may be implemented by a universal component such as a computer or network component that has sufficient processing capabilities, memory resources, and network throughput capabilities. For example, FIG. 11 shows a universal electronic network component applicable to implement one or more embodiments of a component disclosed in this specification. The network component includes a processor 1102

(which may be referred to as a central processing unit, CPU). The processor 1102 communicates with a storage device that includes a second memory 1104, a read-only memory (ROM) 1106, a random access memory (RAM) 1108, an input/output (I/O) device 1110, and a network connectivity device 1112. The processor 1102 may be implemented by one or more CPU chips, or may be implemented by a part of one or more application-specific integrated circuits.

The second memory 1104 is typically constituted by one or more disc drives or disk drives. The second memory 1104 is configured to perform non-volatile data storage, and is used as a data storage device for overflow when the RAM 1108 cannot accommodate all operation operating data. The second memory 1104 may be configured to store programs that are loaded into the RAM 1108 when they are selected for execution. The ROM 1106 is configured to store an instruction and/or data read during program execution. The ROM 1106 is a non-volatile storage device. Typically, in relative to the second memory 1104 with a relatively large storage capacity, a storage capacity of the ROM 1106 is relatively small. The RAM 1108 is configured to store volatile data, and may store an instruction. Access to the ROM 1106 and the RAM 1108 is usually faster than access to the second memory 1104.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
   in a sequential plurality of moments, sending a plurality of signals to a user side on a first line set and a second line set, wherein at a first moment of the plurality of moments, a phase of a first signal of the plurality of signals that is sent on the first line set is rotated with respect to a second signal of the plurality of signals that is concurrently sent on the second line set, and wherein in each moment of the plurality of moments after the first moment, a respective signal of the plurality of signals sent on the first line set has a phase that is rotated with respect to a preceding signal of the plurality of signals sent on the first line set, the phase of the respective signal of the plurality of signals sent on the first line set is different than a phase of a respective signal of the plurality of signals that is concurrently sent on the second line set, and the preceding signal of the plurality of signals sent on the first line set is sent to the user side before the phase of the respective signal of the plurality of signals sent on the first line set is rotated with respect to the preceding signal, wherein the first line set comprises an activated channel or a channel that is being activated, the second line set comprises an activated channel or a channel that is being activated, and crosstalk is caused by the plurality of signals on the second line set against the plurality of signals on the first line set during transmission of the plurality of signals;
   receiving a first rotation factor that is fed back by the user side, wherein the first rotation factor corresponds to a rotation that is used to send one of the plurality of signals on the first line set, and the first rotation factor is selected according to a signal-to-noise ratio or a power of the one of the plurality of signals that is sent on the first line set; and
   using the first rotation factor fed back by the user side as a fixed rotation factor, and rotating, according to the fixed rotation factor, a phase of a signal to be subsequently sent on the first line set.

2. The method according to claim 1, further comprising:
   in each moment of the plurality of moments after the first moment, rotating the phase of the respective signal of the plurality of signals sent on the second line set with respect to the preceding signal of the plurality of signals sent on the second line set.

3. The method according to claim 2, further comprising:
   receiving a second rotation factor that is of a received signal on the second line set that is fed back by the user side, wherein the second rotation factor corresponds to a rotation that is used to send one of the plurality of signals on the second line set, and the second rotation factor is selected according to a signal-to-noise ratio or a power of the one of the plurality of signals that is sent on the second line set.

4. The method according to claim 1, wherein the plurality of signals that are sent on the second line set are directly sent to the user side without phase rotation.

5. The method according to claim 1, wherein the plurality of signals are pilot signals, and the plurality of signals sent on the first line set and the second line set are synchronous.

6. The method according to claim 1, wherein each signal of the plurality of signals that is sent on the first line set is rotated according to a preset set of rotation factors, and wherein the user side acquires the preset set of rotation factors.

7. A method, comprising:
   in a sequential plurality of moments, separately receiving a plurality of signals that are sent from a network side on a first line set and a second line set, wherein at a first moment of the plurality of moments a first signal of the plurality of signals is received on the first line set and a second signal of the plurality of signals is received on the second line set, wherein before the first signal and the second signal are sent on the first line set and the second line set, a phase of the first signal is rotated with respect to the second signal of the plurality of signals, and wherein for each moment of the plurality of moments after the first moment, a respective signal of the plurality of signals is received on the first line set, wherein before the respective signal is sent on the first line set a phase of the respective signal is rotated with respect to a preceding signal of the plurality of signals that is sent on the first line set, the phase of the respective signal that is sent on the first line set is different than a respective signal of the plurality of signals that is concurrently transmitted on the second line set, and the preceding signal sent on the first line set is sent to a user side before the phase of the respective signal sent on the first line set is rotated with respect to the preceding signal, wherein the first line set comprises an activated channel or a channel that is being activated, the second line set comprises an activated channel or a channel that is being activated, and crosstalk is caused by the plurality of signals on the second line set against the plurality of signals on the first line set during transmission;
   for each signal of the plurality of signals that is received on the first line set, comparing a quality status of the respective signal to at least one other signal that is received on the first line set, and selecting a target signal for signal processing, wherein the target signal is selected according to a signal-to-noise ratio or a high power of the target signal;

determining a first rotation factor of the target signal on the first line set, wherein the first rotation factor corresponds to a rotation that is used to send the target signal; and notifying the network side of the first rotation factor of the target signal.

8. The method according to claim 7, wherein the plurality of signals are pilot signals, and the plurality of signals on the first line set and the second line set are sent synchronously.

9. The method according to claim 7, wherein the method further comprises:

notifying the network side of a second rotation factor, wherein the second rotation factor corresponds to a rotation that is used to send one of the plurality of signals on the second line set, and the second rotation factor is selected according to a signal-to-noise ratio or a power of the one of the plurality of signals that is received on the second line set.

10. A network side device, comprising:
a transmitter;
a processor; a
receiver; and
a non-transitory computer-readable storage medium storing a program to be executed by the processor, the program including instructions for:
in a sequential plurality of moments, sending, using the transmitter, a plurality of signals to a user side on a first line set and a second line set, wherein at a first moment of the plurality of moments, a phase of a first signal of the plurality of signals that is sent on the first line set is rotated with respect to a second signal of the plurality of signals that is sent on the second line set, and wherein in each moment of the plurality of moments after the first moment, a respective signal of the plurality of signals sent on the first line set has a phase that is rotated with respect to a preceding signal of the plurality of signals sent on the first line set, the phase of the respective signal of the plurality of signals sent on the first line set is different than a phase of a respective signal of the plurality of signals that is concurrently sent on the second line set, and the preceding signal of the plurality of signals sent on the first line set is sent to the user side before the phase of the respective signal of the plurality of signals sent on the first line set is rotated with respect to the preceding signal, wherein the first line set comprises an activated channel or a channel that is being activated, the second line set comprises an activated channel or a channel that is being activated, and crosstalk is caused by the plurality of signals on the second line set against the plurality of signals on the first line set during transmission;

wherein the receiver is configured to receive a first rotation factor, wherein the first rotation factor corresponds to a rotation that is used to send one of the plurality of signals on the first line set, and the first rotation factor is selected according to a signal-to-noise ratio or a power of the one of the plurality of signals that is sent on the second line set; and wherein the transmitter is further configured to use the first rotation factor fed back by the user side as a fixed rotation factor, and rotate, according to the fixed rotation factor, a phase of a signal to be subsequently sent on the first line set.

11. The network side device according to claim 10, wherein the transmitter is further configured to directly send the plurality of signals that are sent on the second line set to the user side without phase rotation.

12. The network side device according to claim 10, wherein the receiver is further configured to receive a second rotation factor that is fed back by the user side, wherein the second rotation factor corresponds to a rotation that is used to send one of the plurality of signals on the second line set, and the second rotation factor is selected according to a signal-to-noise ratio or a power of the one of the plurality of signals that is received on the second line set.

13. The network side device according to claim 10, wherein the program further includes instructions for:
in each moment of the plurality of moments after the first moment, rotating the phase of the respective signal of the plurality of signals sent on the second line set with respect to the preceding signal of the plurality of signals sent on the second line set.

14. A user side device, comprising:
a receiver, configured to:
in a sequential plurality of moments, receive a plurality of signals that are sent from a network side on a first line set and a second line set, wherein at a first moment of the plurality of moments a first signal of the plurality of signals is received on the first line set and a second signal of the plurality of signals is received on the second line set, wherein before the first signal and the second signal are sent on the first line set and the second line set, a phase of the first signal is rotated with respect to the second signal of the plurality of signals, and wherein for each moment of the plurality of moments after the first moment, a respective signal of the plurality of signals is received on the first line set, wherein before the respective signal is sent on the first line set a phase of the respective signal is rotated with respect to a preceding signal of the plurality of signals that is sent on the first line set, the phase of the respective signal that is sent on the first line set is different than a respective signal of the plurality of signals that is concurrently transmitted on the second line set, and the preceding signal of the plurality of signals sent on the first line set is sent to the user side device before the phase of the respective signal of the plurality of signals sent on the first line set is rotated with respect to the preceding signal, the first line set comprises an activated channel or a channel that is being activated, the second line set comprises an activated channel or a channel that is being activated, and crosstalk is caused by the plurality of signals on the second line set against the plurality of signals on the first line set during transmission;

a transmitter;
a processor; and
a computer-readable storage medium storing a program to be executed by the processor, the program including instructions for:
for each signal of the plurality of signals that is received on the first line set, comparing a quality status of the respective signal to at least one other signal that is received on the first line set, and determining a first rotation factor, wherein the first rotation factor corresponds to a rotation that is used to send one of the plurality of signals on the first line set, and the first rotation factor is selected according to a signal-to-noise ratio or a power of the one of the plurality of signals that is sent on the first line set; and wherein the transmitter is configured to notify the network side of the first rotation factor.

15. The user side device according to claim 14, wherein the program further includes instructions for performing signal processing on the one of the plurality of signals that is sent on the first line set and that corresponds to the first rotation factor.

16. The user side device according to claim 14, wherein the transmitter is further configured to notify the network side of a second rotation factor, wherein the second rotation factor corresponds to a rotation that is used to send one of the plurality of signals on the second line set, and the second rotation factor is selected according to a signal-to-noise ratio or a power of the one of the plurality of signals that is received on the second line set.

* * * * *

UNITED STATES PATENT AND TRADEMARK OFFICE
CERTIFICATE OF CORRECTION

PATENT NO. : 10,263,664 B2
APPLICATION NO. : 15/495781
DATED : April 16, 2019
INVENTOR(S) : Fanglin Sun Page 1 of 1

It is certified that error appears in the above-identified patent and that said Letters Patent is hereby corrected as shown below:

In the Claims

In Column 12, Lines 16-17, Claim 3, delete "that is of a received signal on the second line set".

In Column 13, Line 4, Claim 7, delete "high".

Signed and Sealed this
Second Day of July, 2019

Andrei Iancu
*Director of the United States Patent and Trademark Office*